US008266136B1

(12) United States Patent
Pogde et al.

(10) Patent No.: US 8,266,136 B1
(45) Date of Patent: Sep. 11, 2012

(54) MECHANISM FOR PERFORMING FAST DIRECTORY LOOKUP IN A SERVER SYSTEM

(75) Inventors: Prashant Pogde, Santa Clara, CA (US); Manish M. Agarwal, Santa Clara, CA (US)

(73) Assignee: NetApp, Inc., Sunnyvale, CA (US)

( * ) Notice: Subject to any disclaimer, the term of this patent is extended or adjusted under 35 U.S.C. 154(b) by 254 days.

(21) Appl. No.: 12/422,648

(22) Filed: Apr. 13, 2009

(51) Int. Cl.
G06F 17/30 (2006.01)

(52) U.S. Cl. .......................... 707/711; 707/741; 707/716

(58) Field of Classification Search .................... 707/825
See application file for complete search history.

(56) References Cited

U.S. PATENT DOCUMENTS

| 4,570,217 | A |   | 2/1986  | Allen et al. |     |
|-----------|---|---|---------|--------------|-----|
| 5,163,131 | A |   | 11/1992 | Row et al.   |     |
| 5,202,979 | A |   | 4/1993  | Hillis et al.|     |
| 5,278,979 | A |   | 1/1994  | Foster et al.|     |
| 5,713,013 | A | * | 1/1998  | Black ......................... | 1/1 |
| 5,742,817 | A |   | 4/1998  | Pinkoski     |     |
| 5,771,379 | A | * | 6/1998  | Gore, Jr. ..................... | 1/1 |
| 5,819,292 | A |   | 10/1998 | Hitz et al.  |     |
| 6,192,408 | B1|   | 2/2001  | Vahalia et al.|    |
| 6,230,200 | B1|   | 5/2001  | Forecast et al.|   |
| 6,560,615 | B1|   | 5/2003  | Zayas et al. |     |
| 6,671,773 | B2|   | 12/2003 | Kazar et al. |     |
| 6,895,413 | B2|   | 5/2005  | Edwards      |     |
| 7,099,866 | B1|   | 8/2006  | Crosbie et al.|    |
| 7,103,616 | B1|   | 9/2006  | Harmer et al.|     |
| 7,313,720 | B1|   | 12/2007 | Eng et al.   |     |
| 7,386,546 | B1|   | 6/2008  | Sentry et al.|     |
| 7,606,817 | B2| * | 10/2009 | Carter ........................ | 1/1 |
| 7,809,776 | B1| * | 10/2010 | Witte et al. ............. | 707/825 |
| 2002/0083037 | A1 |   | 6/2002  | Lewis et al. |     |
| 2003/0182322 | A1 |   | 9/2003  | Manley et al.|     |
| 2003/0182389 | A1 |   | 9/2003  | Edwards      |     |
| 2004/0030668 | A1 |   | 2/2004  | Pawlowski et al. | |
| 2004/0054748 | A1 |   | 3/2004  | Ackaouy et al.|    |
| 2005/0015354 | A1 |   | 1/2005  | Grubbs et al.|     |
| 2005/0246401 | A1 |   | 11/2005 | Edwards et al.|    |
| 2005/0246612 | A1 |   | 11/2005 | Leis et al.  |     |
| 2006/0277221 | A1 |   | 12/2006 | Zavisca et al.|    |
| 2006/0288026 | A1 |   | 12/2006 | Zayas et al. |     |
| 2010/0134281 | A1 | * | 6/2010  | Duffy et al. ............. | 340/540 |

OTHER PUBLICATIONS

Akyurek, Sedat, Placing Replicated Data to Reduce Seek Delays, Department of Computer Science, University of Maryland, UMIACS-TR-91-121, CS-TR-2746, Aug. 1991.

Bitton, Dina, Disk Shadowing, Proceedings of the 14.sup.th VLDB Conference, LA, CA (1988), 8 pages.

Chaudhuri, Surajit, et al., Self-Tuning Technology in Microsoft SQL Server, Data Engineering Journal 22, Feb. 1999 pp. 20-27.

Chutani, Sailesh, et al., The Episode File System, In Proceedings of the USENIX Winter 1992, 18 pages.

Coyne, Robert A., et al., Storage Systems for National Information Assets, Proc. Supercomputing 92, Minneapolis, Nov. 1992, pp. 626-633.

(Continued)

*Primary Examiner* — Isaac Tecklu
*Assistant Examiner* — Deric Ortiz
(74) *Attorney, Agent, or Firm* — Cesari and McKenna, LLP

(57) ABSTRACT

Embodiments of the present invention provide a novel technique for maintaining directory-based quota, for performing directory notification to a client system, and performing other such operations by efficiently finding ancestral directory associations on a server system without performing multiple accesses to data structures associated with the directory associations. Since data structures do not need to be accessed multiple times, performance of the server system can be improved.

27 Claims, 9 Drawing Sheets

OTHER PUBLICATIONS

Finlayson, Ross S., et al., Log Files: An Extended File Service Exploiting Write-Once Storage Department of Computer Science, Stanford University, Report No. STAN-CS-87-1177, Sep. 1987, 14 pages.

Gray, Jim, et al., The Recovery Manager of the System R Database Manager, ACM Computing Surveys, (13)2:223-242 1981, 20 pages.

Hecht, Matthew S., et al. Shadowed Management of Free Disk Pages with a Linked List, ACM Transactions on Database Systems, 8/4, Dec. 1983, pp. 503-514.

Howard, John H, et al., Scale and Performance in a Distributed File System, Carnegie Mellon University, CMU-ITC-87-068, Aug. 5, 1987, 33 pages.

Howard, John H., An Overview of the Andrew File System, Carnegie Mellon University, CMU-ITC-88-062 1988, 6 pages.

Howard, John, H. et al., Scale and performance in a distributed file system, ACM Trans. Computer. System., 6(1), Feb. 1988 pp. 51-81.

Kazar, Michael L., Synchronization and Caching Issues in the Andrew File System, Carnegie Mellon University, CMU-ITC-88-063, 12 pages.

Kazar, Michael L., et al., Decorum File System Architectural Overview, USENIX Summer Conference, Anaheim, California, 1990, 13 pages.

Kemper, Alfons, et al., Performance Tuning for SAP R/3, Data Engineering Journal 22, Feb. 1999 pp. 33-40.

Kent, Jack et al., Optimizing Shadow Recovery Algorithms, IEEE Transactions on Software Engineering, 14(2): 155-168, Feb. 1988.

Kistler, et al., Disconnected Operation in the Coda File System, ACM Transactions on Computer Systems, vol. 10, No. 1, Feb. 1992, pp. 3-25.

Lorie, Raymond, A, Physical Integrity in a large segmented database, ACM Trans. Database Systems, 2(1): 91-104, Mar. 1977.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).

Peterson, Zachary Nathaniel Joseph, Data Placement for Copy-on-Write Using Virtual Contiguity, University of CA, Santa Cruz, Master of Science in Computer Science Thesis, Sep. 2002.

Quinlan, Sean, A Cached WORM File System, Software-Practice and Experience, 21(12):1289-1299 (1991).

Rosenblum, Mendel, et al. The Design and Implementation of a Log-Structured File System Jul. 24, 1991 pp. 1-15.

Rosenblum, Mendel, The Design and Implementation of a Log-Structured File System, 1992, pp. 1-93.

Rosenblum, Mendel, et al., The Design and Implementation of a Log-Structured File System, In Proceedings of ACM Transactions on Computer Systems, (10)1:26-52, Feb. 1992.

Rosenblum, Mendel, et al., The LFS Storage Manager, Computer Science Division, Electrical Engin. and Computer Sciences, Univ. of CA, presented at Summer '90 USENIX Technical Conference, Anaheim, CA Jun. 1990, 16 pages.

Schiefer, Berni, et al., DB2 Universal Database Performance Tuning, Data Engineering Journal 22, Feb. 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, Feb. 1999 pp. 41-47.

Sidebotham, Bob, Volumes: The Andrew File System Data Structuring Primitive, EEUG Conference Proceedings, Manchester, UK, Autumn 1986.

Subramanian, Muralidhar, et al., Performance Challenges in Object-Relational DBMSs, Data Engineering Journal 22, Feb. 1999 pp. 28-32.

Weikum, Gerhard, et al., Towards Self-Tuning Memory Management for Data Servers, Data Engineering Journal 22, Feb. 1999 pp. 3-11.

West, Michael, et al. The ITC Distributed File System: Prototype and Experience, Carnegie-Mellon University, Technical Report CMU-ITC-040, Mar. 1985, 17 pages.

Zayas, Edward R., AFS-3 Programmer's Reference: Architectural Overview, Transarc Corporation, Pittsburgh, PA, 1.0 edition 1991, 37 pages.

Hitz, Dave et al., File System Design for an NFS File Server Appliance, Technical Report 3002, Rev. C395, presented Jan. 19, 1994, 23 pages.

* cited by examiner

MECHANISM FOR PERFORMING FAST DIRECTORY LOOKUP IN A SERVER SYSTEM

FIELD OF THE INVENTION

The present invention relates to operation of a server system and more particularly to a technique for performing directory notification to a client system, maintaining directory-based quota, and other such operations by efficiently finding ancestral directory associations.

BACKGROUND

A server system is a processing system utilized to store and retrieve data on behalf of one or more clients. A server system operates on behalf of the one or more client systems to store and manage shared data in a set of mass storage devices, such as magnetic or optical storage-based disks or tapes. A server system may include an operating system that implements a file system for storing and organizing computer files and the data they contain. A file system is any organization of data in a structured manner, which is typically organized as a hierarchical set of stored files, directories and/or other types of data containers. Data stored by a server system may be stored in the form of multiple blocks that each contains data. A block is the unit used by a file system in a server system to manipulate and transfer data. A typical file system may contain thousands (or even hundreds of thousands) of directories. Related files are stored in the same directory. A directory contained inside another directory is called a subdirectory. For efficient data processing of a data structure, a directory can be represented as a tree having a plurality of nodes.

With reference now to FIG. 4, an exemplary directory structure 400 stored on a server system is illustrated. Those skilled in the art would understand that FIG. 4 is described herein to briefly introduce a concept of a file directory structure. FIG. 4 will be described in more detail later to describe various embodiments of the invention. A node (e.g., a data container, directory, or a subdirectory) within a directory structure has zero or more child nodes. A node that has a child is called a parent node. A node typically has at most one parent, except for the root node, which does not have a parent node. A parent node is associated with one or more links (such as links l1 and l2), which point to its child nodes. These links indicate a logical association between the parent nodes and the child nodes. For example, node X is a root node of the data structure 400 and it is a parent of child nodes A and B. Being the topmost node, the root node X does not have parents. In directory structure 400, root node X and nodes A, B, D, E, and G are directory nodes. Nodes C, F, H, and I are leaf nodes (e.g., nodes at the bottom level of the data structure). In the directory structure 400, G and H are data containers within directory D. H and I are data containers within directory E, and F is a data container within directory B. Each node, whether it is a directory node or a data container node, has an inode number associated with it. Ancestors of a node include all parents, grandparents, etc. An inode is a data structure storing information about a data container, such as, for example, an identifier of the device where the inode resides, locking information, a type of the data container, the number of links to the data container, the owner's user and group identification, the number of bytes in the data container, access and modification times, the time the inode itself was last modified, as well as other data. An inode number refers to a pointer of an inode data structure, and thus its associated data container. An inode number is used to look up an entry in the inode data structure. A root inode is an entry point used during processing of the node tree, and is located at a readily identified location on a storage device, e.g., disk.

Finding out all ancestral directory associations (i.e., direct or indirect parent nodes) of a data container given the data container identifier has been a common problem in implementing some operations of a computer system, such as performing directory notification to a client, maintaining directory-based quotas, and other such operations.

Directory notification service is a mechanism by which a client system can register with a file system for notifications about accesses, changes, or modifications to a file within a particular directory. For example, an application resident on a client system can register with the server system by exposing Application Programming Interfaces (API) to the file system. Server system may maintain mappings between directories being watched for modifications and applications that are registered to receive updates regarding modifications to directories. An application can specify a set of conditions that trigger notification, such as changes to data container names, directory names, attributes, data container size, time of last write, and security. Notification service typically suffers from severe performance penalties. Currently, a Network File System (NFS) client can access a particular data container at a server system using a data container handler that typically encapsulates the inode number of the data container. However, in order to determine all parent nodes of the data container (and thus its path name to the root node), each inode data structure, which is associated with a data container and thus maintains a pointer to its parent, needs to be accessed. Once the immediate parent node is identified, the next immediate parent node needs to be determined (again by accessing a corresponding inode data structure for that node that identifies its parent) and so forth until the complete path name of the node up to the root node is established. Accessing inode data structures in order to retrieve a pointer may require multiple accesses to storage devices where the inode data structures reside. When the path of a data container is determined, the server system compares the path to the names of the directories for which notifications are requested by the client system. Such a comparison may be performed by using, for example, a text based match. If a match is found, the server system issues notifications to clients registered for notifications. Thus, identifying a complete path name of a data container that was accessed and modified may involve multiple accesses to storage devices, which in turn, leads to compromised performance.

Maintaining directory quota by a server system involves setting a data container and block (storage) usage limit on a per directory basis, e.g., a limit on the usage by a particular user at a client system or a group for data containers files and sub-directories that reside under a given directory. Thus, if a data container is modified by a client system (e.g., file system allocates more data blocks or frees data blocks) and a directory that includes a particular data container has a quota which cannot be exceeded, client systems need to be notified by the server system about the changes. Again, finding parent directories of a data container or directory by a server system may involve finding an upward path of the modified data container or directory in the file system all the way up to the root node. Upward traversal can be costly because it involves accessing by the file system one node at a time in a directory structure. Every node access results in a new access to a storage device in order to retrieve a pointer to a parent node. Moreover, maintaining hard links by the file system make the above tasks even more difficult. A node in a file system is said to have a hard link if it has more than one parent directory so that more than one parent node has a pointer to the node. As such, hard links lead to more than one way to reach to the node in the directory tree from the root, and thus may potentially lead to multiple accesses of data structures associated with a node (e.g., inode data structures).

Accordingly, what is a needed is a mechanism that performs directory notification to a client, maintains directory-based quota and other such operations more efficiently.

SUMMARY

Embodiments of the present invention provide a novel technique for maintaining directory-based quota, for performing directory notification to a client system, and performing other such operations by efficiently finding ancestral directory associations of directories and data containers on a server system without performing multiple accesses to data structures of ancestors of the data containers or directories. Rather, to determine ancestral directory associations of a data container or a directory, a data structure of the data container or the directory can be accessed. Since data structures of all ancestors do not need to be accessed, performance of the server system can be improved.

The server system includes an index generation engine configured to generate an index for each node of a file system including a plurality of nodes, each node can be a data container having an associated data structure (i.e., inode data structure, which stores data describing a data container). To generate the indices for a node, the index generation engine only accesses inode data structures of immediate parent nodes of the data container and does not need to access inode data structures associated with ancestors of the node, thereby reducing the number of accesses to the inode data structure stored in memory or on a storage device. The index generation engine uses the property of the prime number (that is a number divisible only by one and by itself without leaving a remainder) to generate indices for the nodes in the file system. The server system also includes an index manipulation engine configured to mathematically manipulate the indices of a data container or a directory node to determine ancestor nodes of a data container in a directory watched by the client system for modifications. To this end, the index manipulation engine only needs to access inode data structure associated with a data container rather than accessing inode data structures associated with all ancestor nodes.

The server system also includes a directory notification engine configured to send a notification to the client system of a modification to the data container. Index generation engine, index manipulation engine, and directory notification engine may be implemented in software executed on a programmable processor, hardware or a combination of hardware and software. That is, in an alternative embodiment, these engines be implemented as logic circuitry embodied, for example, within a microprocessor, controller, like programmable gate array or an application specific integrated circuit (ASIC).

Other aspects of the invention will become apparent from the following detailed description taken in conjunction with the accompanying drawings, which illustrate the principles of the invention by way of example.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
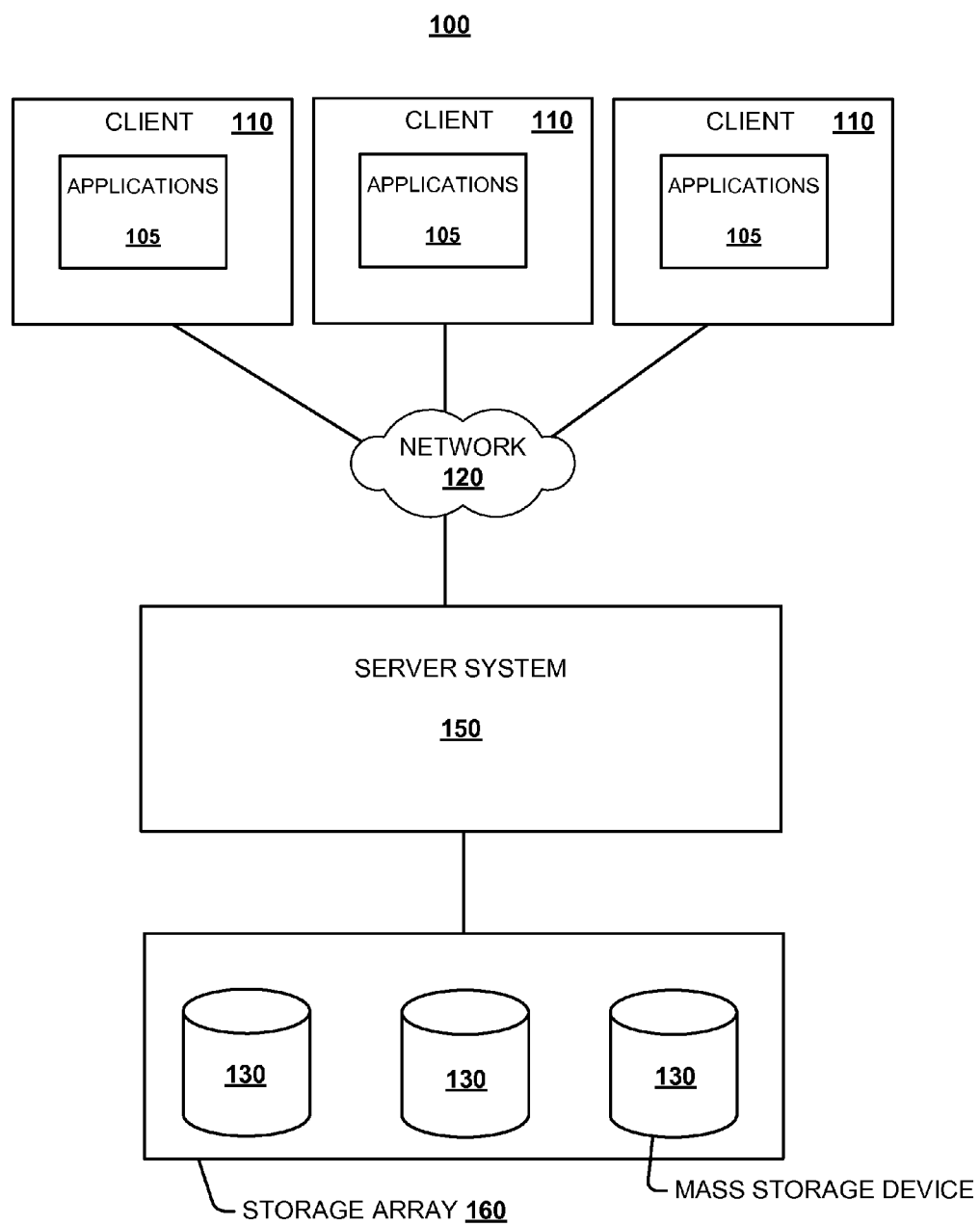
FIG. 1 is a diagram of a computing environment including the server system where embodiments can be implemented.

FIG. 1 illustrates computing environment in which the embodiments described herein can be implemented. The server system environment 100 includes one or more server systems 150 interconnected with a plurality of clients 110 via network 120. For ease of description, only one server system is shown in FIG. 1. Server system 150 is connected to one or more storage devices onto which data may be stored, and from which data may be obtained, as desired. The server system 150 may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The storage devices can also be solid state devices (e.g., flash) or other persistent storage devices or combinations of those.

In operation, the server system 150 services data access requests from the client system (client) 110. Each client 110 may be a general-purpose computer configured to execute applications and interact with the server system 150 in accordance with a client/server model of data delivery. That is, the client 110 may request the services of the server system 150, and the server system may return the results of the services requested by the client by exchanging packets over the network 120. The clients 110 may issue packets using file-based access protocols, such as the Common Internet File System (CIFS) protocol or Network File System (NFS) protocol, over TCP/IP when accessing data in the form of data containers, such as files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing data in the form of data containers, such as blocks. Also, connected to the server system 150 are one or more mass storage devices 130, such as disks organized as a storage array 160. Storage devices 130 may comprise a writable storage device media, such as magnetic disks, optical or magnetic tape, flash, and any other similar media adapted to store information (including data and parity information).

As described herein, one application of the above-illustrated technique is to notify applications (such as applications 105 executed at a client system 110, as shown in FIG. 1) about modifications to a data container within a directory of a file system (e.g., file system 210) of a server system 150. An application can be, for example, Windows Explorer®, provided by Microsoft Corporation of Redmond, Wash. Those skilled in the art would understand that other applications may register for notification services. Applications 105 can register with file system 210 at the server system 150 by exposing Application Programming Interfaces (API) to the file system at the server system. Server system 150 maintains a mapping (not shown in figures) between applications that are registered to receive updates and directories that are being watched. An application can specify a set of conditions that trigger notification. The conditions may include changes to data container names, directory names, attributes, data container size, time of last write, and/or security.

Figure 2:
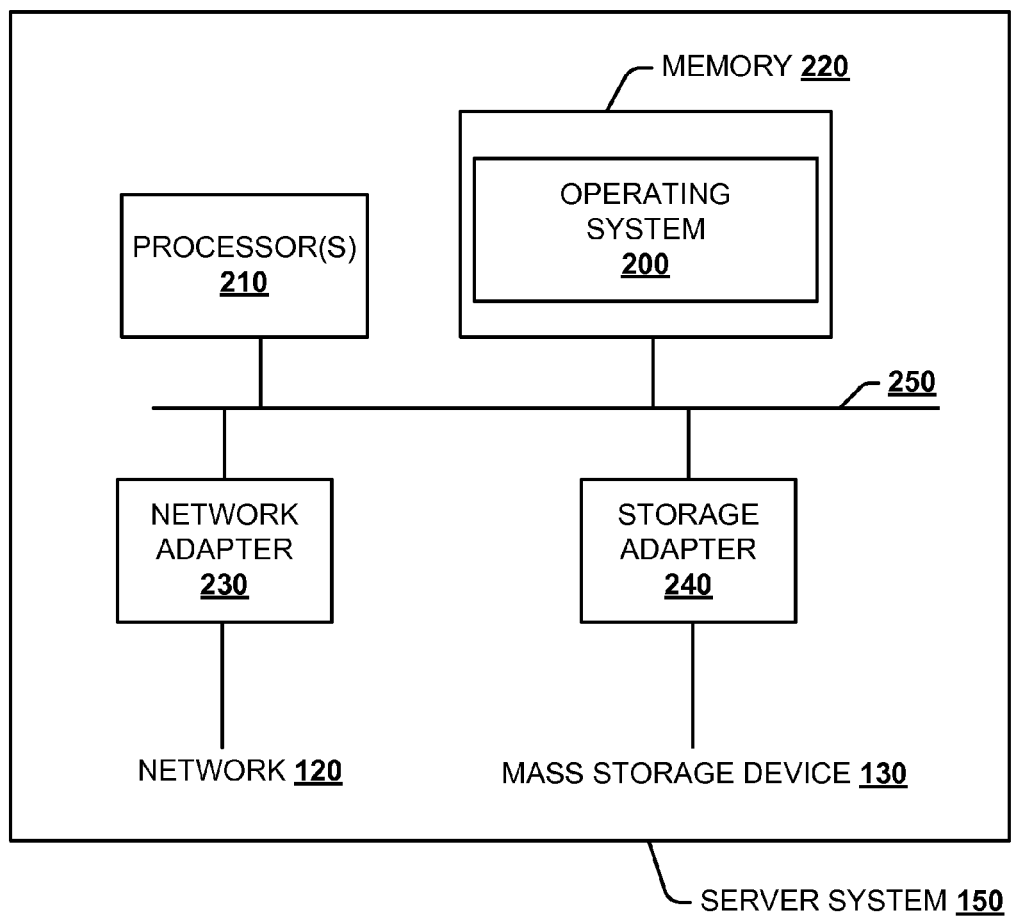
FIG. 2 is a diagram of various components of the server system shown in FIG. 1.

Referring now to FIG. 2, it illustrates various components of server system 150 shown in FIG. 1. Server system 150 may be a device or a combination of devices that provides storage service relating to the organization of data on mass storage devices 130, such as disks. Server system 150 illustratively comprises a processor 210, a memory 220, one or more network adapters 230 and one or more storage adapters 240 interconnected by a system bus 250 or the like. Each network adapter 230 comprises the mechanical, electrical and signaling circuitry needed to connect the server system 150 to clients 110 over the network 120. Server system 150 also includes the operating system 200 that includes or interacts with various engines (as described in reference to FIG. 2 or 3). The processor and adapters may, in turn, comprise processing elements and/or logic circuitry configured to execute software code and manipulate data structures. It will be apparent to those skilled in the art that other processing and memory means, including various computer readable media, may be used for executing and storing program instructions pertaining to the inventive technique described herein.

The storage adapter 240 cooperates with the operating system 200 executing on server system 150 to store and retrieve data requested on any type of attached array of writable storage device media such as magnetic disks, optical or magnetic tape, flash, and any other similar media adapted to store information (including data and parity information). However, as illustratively described herein, the data are stored on the disks, such as hard disk drive (HDD) and/or Direct Access Storage Device (DASD). The storage adapter includes input/output (I/O) interface circuitry that couples to the storage devices over an I/O interconnect arrangement, such as a conventional high-performance, Fibre Channel (FC) serial link topology. In the illustrative embodiment, the memory 220 comprises storage locations that are addressable by the processor and adapters for storing software program code, such as operating system 200.

Figure 3:
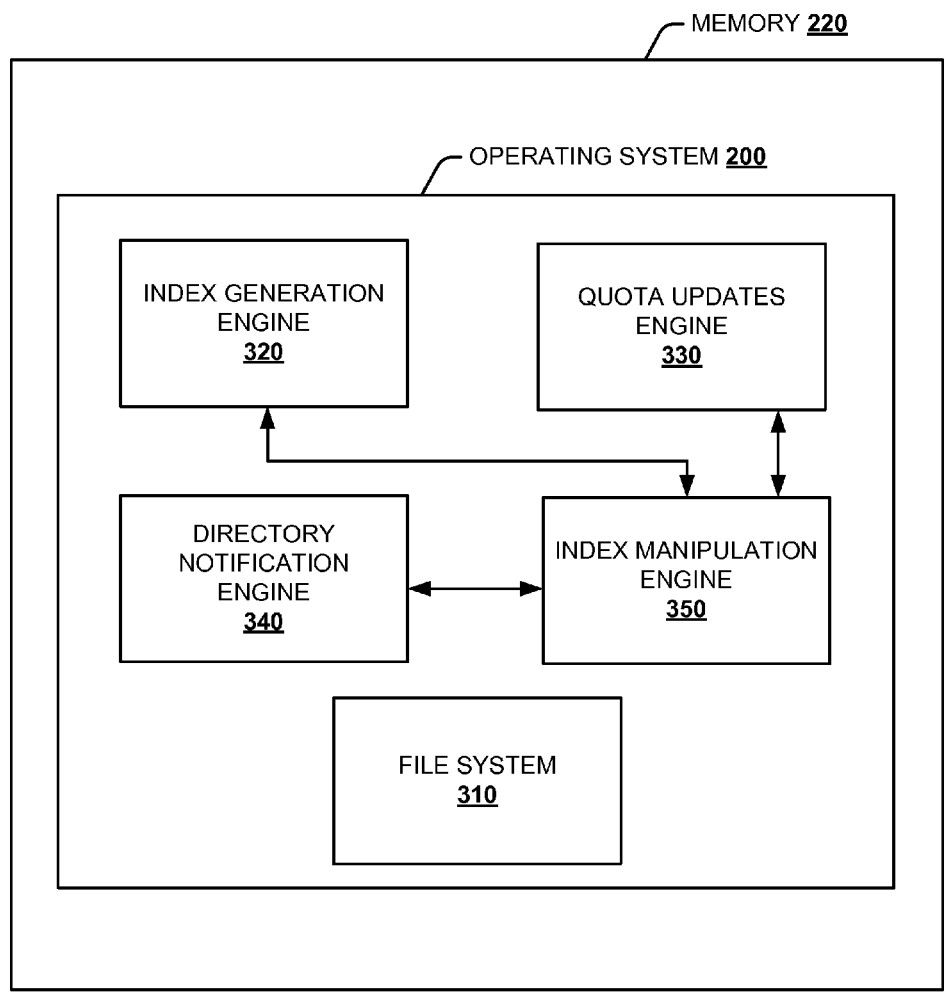
FIG. 3 is a diagram of various engines of operating system shown in FIG. 2.

Referring now to FIG. 3, it illustrates a schematic block diagram of components of operating system 200 of server system 150 that may be advantageously used with embodiments of the present invention. Server system 150 may implement a file system 310. The file system 210 comprises a set of data containers and directories stored on one or more of the mass storage devices 130. In one embodiment, the file system stores data containers (such as files) on disks as blocks, for example, using, e.g., 4 kilobyte (KB) data blocks, and using inodes to describe the data containers. An inode is a data structure (shown in FIG. 7 and described above), e.g., a 128-byte structure, which may be used to store metadata about a data container. Metadata describes a data container and may include a number of attributes, such as ownership of the data container, access permission for the data container, size of the data container, data container type and location of the file on disk, as described below. According to embodiments described herein, metadata also stores Parent_Index and Immediate Parent_Index of a node, which are generated by an index generation engine shown in FIG. 3. An inode number refers to a pointer of an inode data structure.

In the illustrative embodiment, the operating system 200 can be the NetApp® Data ONTAP™ operating system available from NetApp, Inc., of Sunnyvale, Calif., that implements a Write Anywhere File Layout (WAFL™) file system, such as file system 310. However, it is expressly contemplated that any appropriate file system may be enhanced for use in accordance with the inventive principles described herein. As used herein, the term "operating system" generally refers to the computer-executable code operable on a computer that manages data access, although some or all of its functions can be otherwise implemented in logic circuitry and other devices.

The operating system 200 executes index generation engine 320, quota updates engine 330, directory notification engine 340, and index manipulation engine 350. Index generation engine 220 is configured to generate an index for each node of a file system, comprising a plurality of nodes. Each node has a data container. Index generation engine stores the generated indices in an inode data structure associated with a node. Index generation engine 320 generates indices for directory nodes and data container nodes at the time of their creation. A first index of the directory node can be expressed as an inode number (e.g., a unique number associated with a directory node and used to lookup an inode data structure which stores information about the directory, such as its type, size, and location). A second index is a Parent_Index generated as a result of performing mathematical manipulation on two indices of the immediate parent nodes. Those skilled in the art would understand that in other embodiments, mathematical manipulations can be performed on more than two indices.

Index generation engine 320 is also responsible for generating a tuple of indices for each leaf node. A first index is a Parent_Index, which is generated as a result of mathematical manipulation of indices of the immediate parents of the leaf node (such as by multiplying two indices of the immediate parents). A second index is Immediate Parent_Index, which is generated by performing mathematical manipulation by e.g., multiplying inode numbers of immediate parents of the leaf node.

Index manipulation engine 350 is responsible for mathematically manipulating the generated indices stored in corresponding inode data structure to determine an ancestor node of a data container, in response to receiving a request from the client computer system. Importantly, index manipulation engine 350 determines an ancestor node of a data container without accessing an inode data structure associated with all ancestors of the data container. For example, index manipulation engine 350 is configured to determine whether a client registered for modifications within a directory needs to be notified. To this end, index manipulation engine accesses an inode data structure associated with a modified data container and mathematically manipulates indices of the data container to determine ancestors (e.g., directories) where the data container resides. Index manipulation engine 350 is further configured to determine inode numbers of the directories that are on a path to a data container in the directory structure. If the directories that are on the path to the data container are the directories being watched for modifications by a client computer system, directory notification engine 340 sends notifications to the client computer system of a modification to the data container within the directory watched by the client system for modifications. The client system will typically have subscribed for such watch service from the server system by requesting such service at an earlier point in time.

Quota updates engine 330 is configured to send to client systems quota updates for directories watched by client systems. Again, the client systems typically will have subscribed for such quota watch services. Maintaining directory quota by a server system involves setting a data container and storage usage limit on a per directory basis, e.g., a limit on the usage by a particular user at a client system or a group for data containers files and sub-directories that reside under a given directory. Thus, if a data container is modified by a client system (e.g., file system allocates more data blocks or frees data blocks) and a directory that includes a particular data container has a quota which cannot be exceeded, client systems need to be notified by the server system about the changes.

Figure 4:
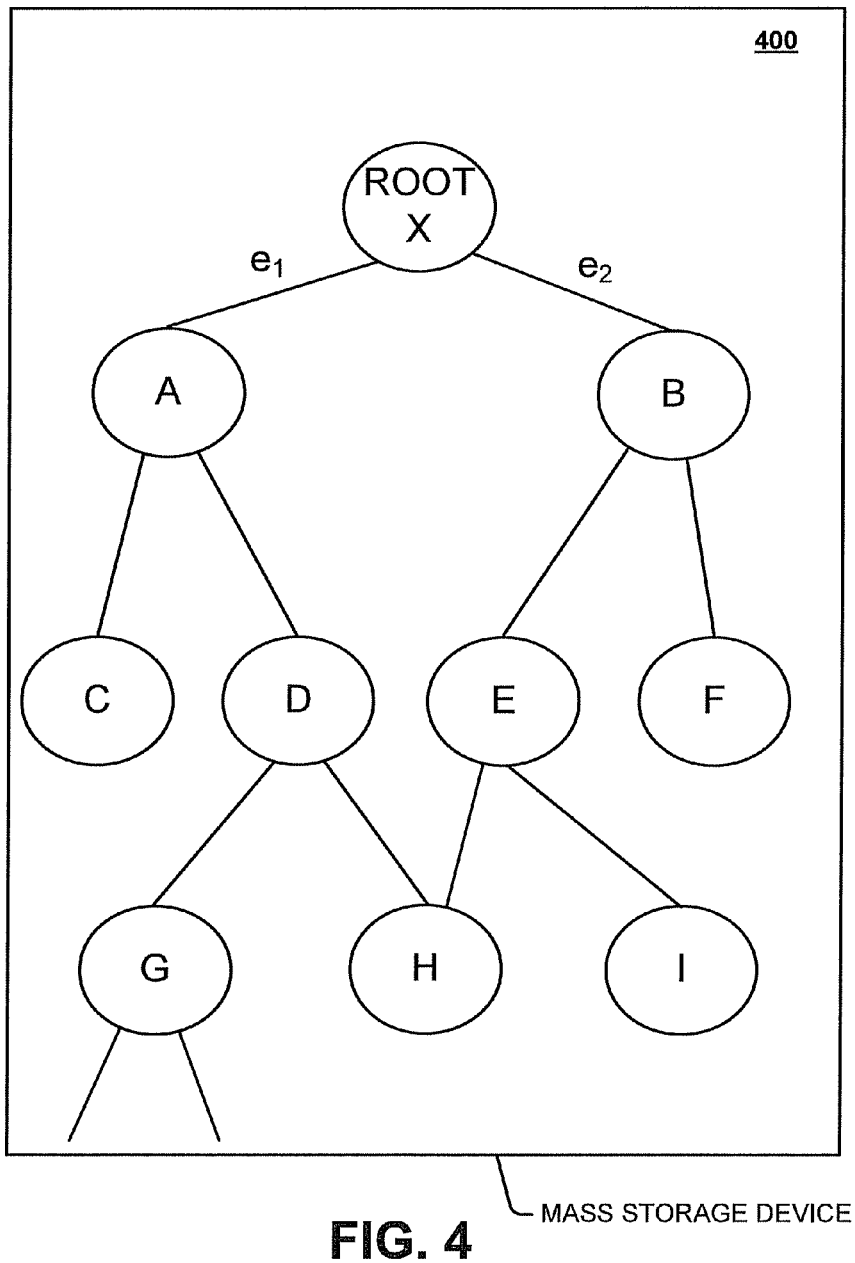
FIG. 4 is a diagram of an exemplary file system directory structure.

Referring now to FIG. 4, it illustrates a directory structure 400 of an exemplary instance of a file system. Such a directory structure can be illustratively stored on mass storage devices 130 shown in FIG. 1. The directory structure is implemented as a tree hierarchy with a set of linked nodes. Each node in the tree represents a directory under the corresponding file system, a sub-directory, or a data container within a directory. Some of the nodes in the directory structure have child nodes, which represent sub-directories in the parent directory or a data container within a directory. For example, in data structure 400, the topmost node in the tree represents the root directory of the file system. Nodes A and B are directories of the file system. Nodes D, E, and G are sub-directories since each of these nodes have a parent node and one or more child nodes (node D has a parent node A and child nodes G and H; node E has a parent node B and child nodes H and I; node G has a parent node D and child nodes (not shown in FIG. 4)). Nodes C, H, I and F are data containers within respective directories since each of them have a parent node, but does not have a child node (thus, node C has a parent node A, but does not have a child node; node H has two parent nodes, D and E, but does not have a child node; node I has a parent node E, but does not have a child node; F has parent B but no child node). An ancestor node of any node A is any node above A in a tree data structure, where "above" means "toward the root." Thus, root is an ancestor of A and B. As described herein, each data container or directory has an inode number associated with it that is provided by the file system upon creation of the data container or directory. An inode number is a unique number associated with a data container or a directory and is used to lookup an inode data structure which stores metadata about a data container.

In prior art systems, typically the file system cannot determine all ancestors of the data container without accessing data structures (e.g., an inode data structure associated with a data container) that maintain a list of immediate parents of a data container, etc, until the data structures for all the direct and indirect parents are accessed. At that time, the full path for the file can be reconstructed. As described herein, an application (such as 105) can register with the file system to receive notifications regarding changes to a particular directory identified by a directory name. The file system maintains a data structure (not shown in figures) identifying the name of each watched directory. Thus, to determine whether a directory needs to be notified, in prior art implementations, a text-based comparison would have been performed between the data container name or directory name path and a name of a directory that is watched by client systems for modifications. This mechanism is inefficient since it requires multiple accesses to data structures.

According to embodiments described herein, a technique is provided for performing operations of a server system, such as providing directory notification to a client, maintaining directory-based quotas and other such operations by efficiently finding ancestral directory associations. According to the technique, ancestor nodes of a data container or a directory node can be performed efficiently without performing costly accesses of data structures associated with ancestor nodes of a data container in a server system.

Figure 6:
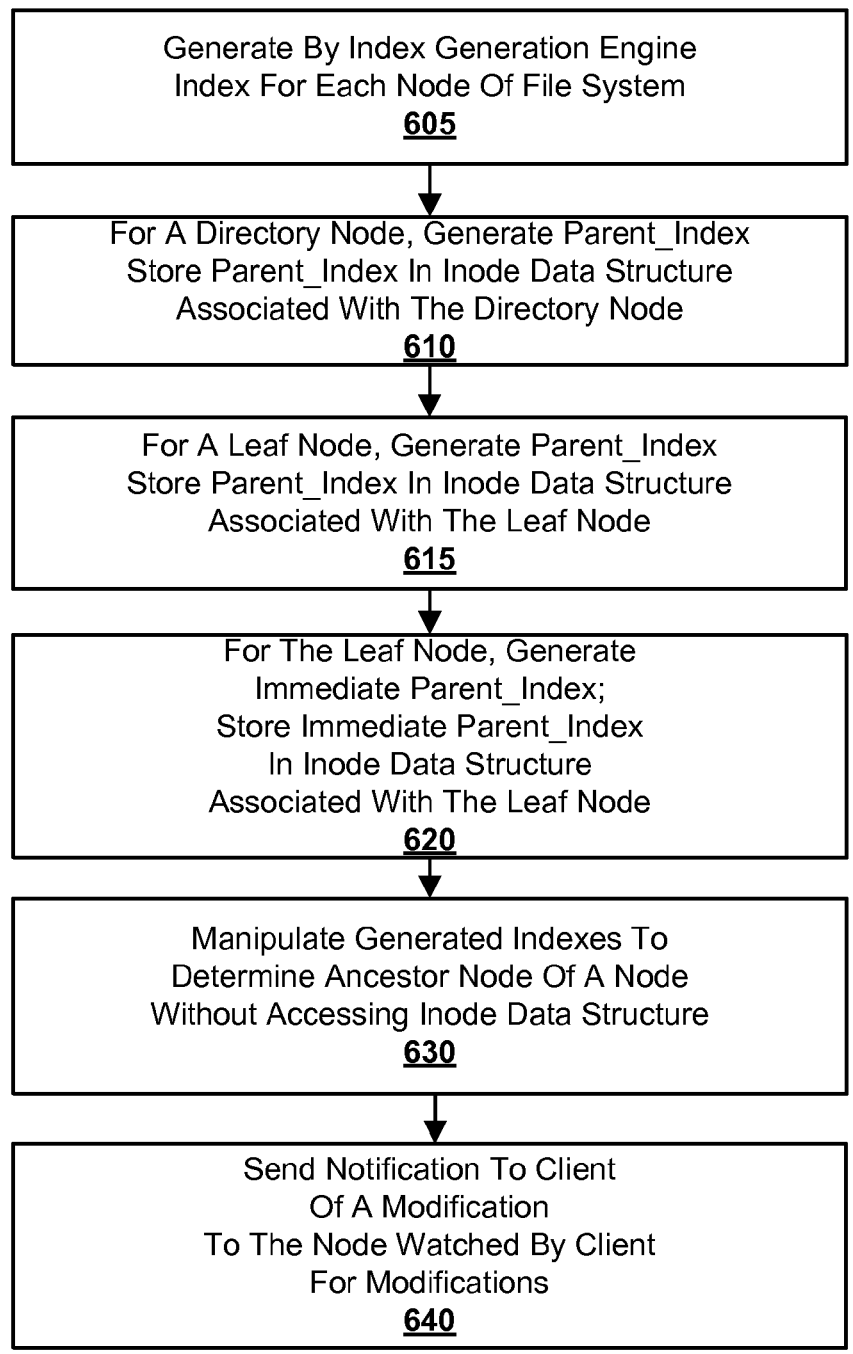
FIG. 6 is a flow diagram of a process performed by the server system shown in FIG. 1 to identify directories watched by the client system for modifications according to embodiments of the present invention.

With reference now to FIG. 6, according to the computer-implemented method described in FIG. 6, a tuple of indices is generated for a root node, directory nodes (nodes that have children), and sub-directory nodes (nodes that have children and parent nodes as directory nodes) as follows (step 605). For a directory node, in one embodiment, the first index is an inode number (provided by the file system at the node creation) expressed as a unique prime number. The prime number is a number that is divisible without a remainder only by one and by itself. The second index (referred to herein as a Parent_Index) is generated as a result of performing mathematical manipulation on the two indices of an immediate parent node (step 610). For example, in one implementation, the second index is generated by multiplying two indices of an immediate parent node.

The above step can be illustrated in the example shown in FIG. 4. According to embodiments described herein, a first index is stored with the Root, directory and sub-directory nodes A, B, D, E, and G (step 610). In one implementation, the first index serves as an inode number, which can be provided by a file system (e.g., 310 shown in FIG. 3). For example, Root's inode number is "1", A's inode number is "2", B's inode number is "3", and G's inode number is "11" and so on. In an exemplary embodiment, the first index is expressed as a prime number. The choice of prime numbers in the exemplary embodiment is explained by the known properties of the prime numbers such that a prime number is divisible only by one or itself without leaving a remainder and a product of the prime numbers is also divisible only by its prime factors. Thus, to determine whether a given directory is a parent of a data container, the product of the prime numbers associated with the data container can be divided by the unique prime number assigned to the directory. If the product of the prime numbers is divisible by the prime number assigned to the directory without leaving a remainder, it follows that the directory is an ancestor of the data container.

Those skilled in the art would understand that mechanism for computing indices and storing the indices can be performed by index manipulation engine 350 and index generation engine 320. Further, those skilled in the art would understand that index generation engine 320 manipulate various fields of inode data structures of immediate parents of a node within a directory watched for modifications to generate indices and to store the indices on storage devices. Each node in the tree structure is associated with an inode data structure. Thus, there could be as many inode data structures as there are nodes (directories and data containers).

Still with reference to FIG. 4, Parent_Index of each directory and sub-directory node shown in FIG. 4 can be generated as follows:

A's first index is inode number (i.e., 2), which can be provided by the file system. Parent_Index of A is a product of multiplication of indices of the immediate parents of A. Root is an immediate parent of A. Its indices are (1,1). Since the root node does not have immediate parents, its Parent_Index is an inode number. Thus, to generate Parent_Index of A, index generation engine 320 reads the two indices from the inode data structure associated with the root and generates a product of the multiplication of the two indices, e.g., 1. Index generation engine then stores the Parent_Index of A=1 in the inode data structure associated with A.

Parent_Index of B is a product of multiplication of indices of the immediate parents of B. Root is immediate parent of B. Its indices are (1,1). Thus, to generate Parent_Index of B, index generation engine 320 reads the two indices from the inode data structure associated with the root and generates a product of the multiplication of the two indices, e.g., 1. Index generation engine then stores the Parent_Index of B=1 in the inode data structure associated with B.

Parent_Index of D is a product of multiplication of indices of the immediate parent of D. A is immediate parent of D. Its indices are (2,1). Thus, to generate Parent_Index of D, index generation engine 320 reads the two indices from the inode data structure associated with A and generates a product of the multiplication of the two indices, e.g., 2. Index generation engine then stores the Parent_Index of D=2 in the inode data structure associated with 2.

Parent_Index of E is a product of multiplication of indices of the immediate parent of E. B is immediate parent of E. Its indices are (3,1). Thus, to generate Parent_Index of B, index generation engine 320 reads the two indices from the inode data structure associated with the root and generates a product of the multiplication of the two indices, e.g., 3. Index generation engine then stores the Parent_Index of E=3 in the inode data structure associated with E.

Figure 5:
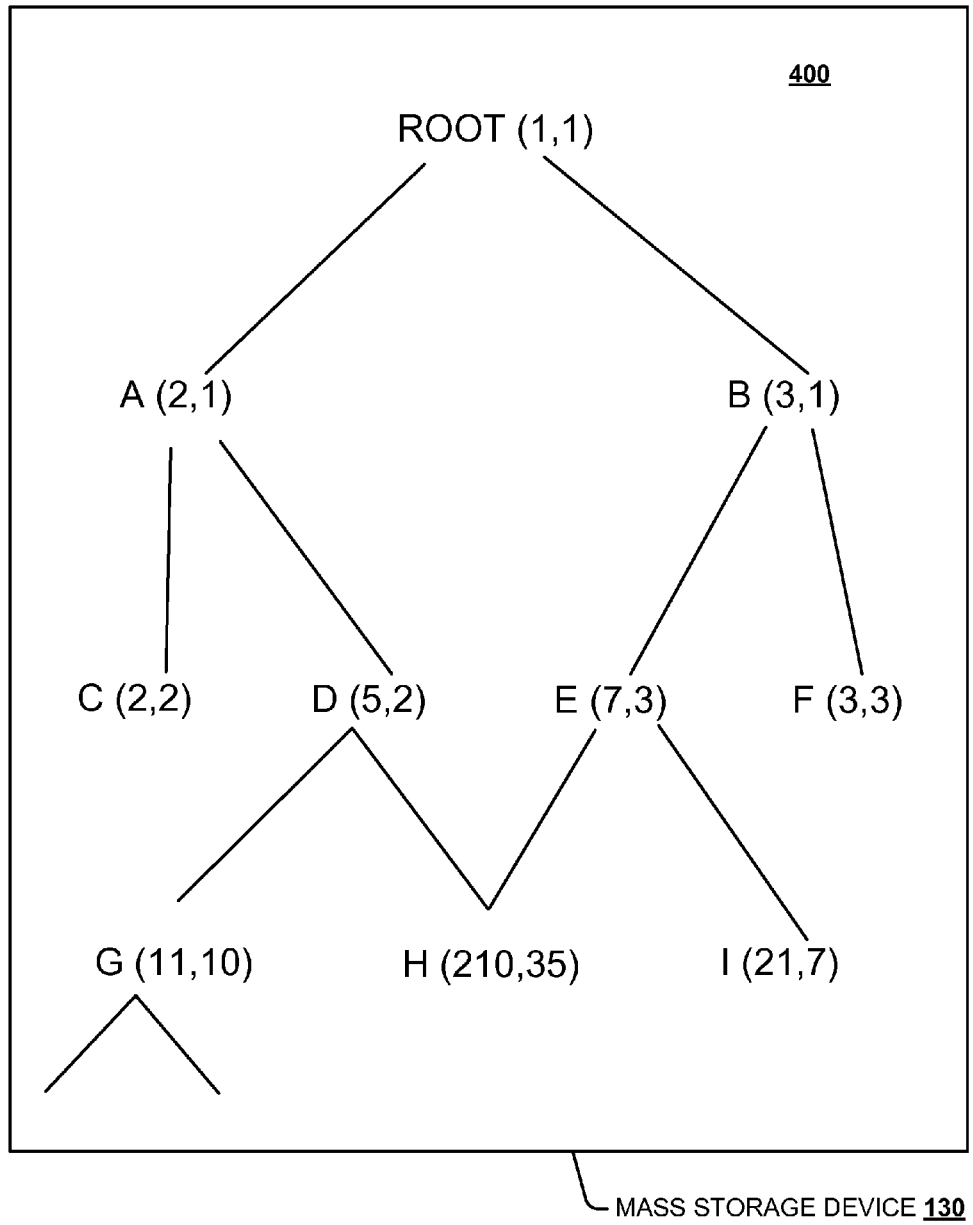
FIG. 5 is a diagram of a directory structure having nodes with generated indices stored on server system shown in FIG. 1.

As shown in FIG. 5, the following tuples of indices are generated and stored at a mass storage device (e.g., 130) for the directory and sub-directory nodes A, B, D, E, and G: A(2,1), B(3,1), D(5,2), E(7,3), and G(11,10). Inode indexes can be provided by file system (e.g., 310).

Thus, for the Root and each directory and sub-directory node in the directory structure, the following tuples of indices are generated and stored. A first index (which can serve as inode number and can be expressed as a unique prime number) can be provided by a file system upon creation of the node. The second index is generated by the index generation engine by mathematically manipulating indices of the immediate parent of the node.

Still with reference to the flow diagram illustrated in FIG. 6, at step 615, for each leaf node (i.e., a node that does not have a child node(s)), the following tuple of indices is generated (Parent_Index, Immediate_Parent_Index), wherein:

The first index, Parent_Index, is generated as a product of multiplication of the Parent_Index and inode number of immediate parents of the leaf node. To this end, index generation engine reads Parent_Index of an immediate parent of the leaf node and an inode number of the parent node and generates Parent_Index of a leaf node as a product of multiplication of the two indices.

The second index, Immediate_Parent_Index, is a product of multiplication of inode numbers of the immediate parents of the leaf node. To this end, index generation engine reads inode numbers of immediate parents of the leaf node from the inode data structures associated with the immediate parents and generates a product of the multiplication of the inode numbers.

When a hard link is added by a file system (e.g., file system 310 shown in FIG. 3) to a leaf node from another directory, the leaf node can have more than one parent. When a hard link is added to a leaf file node, index generation engine generates a new tuple of indices for a leaf node as follows:

Parent_Index is a product of multiplication of inode numbers with Parent_Index of all immediate parents of the leaf node. Immediate Parent_Index is a product of multiplication of inode numbers of all immediate parents of the leaf node.

The above described step of generating indices for leaf nodes can be explained in using the exemplary directory structure 400 shown in FIG. 4. Nodes C, H, I, and F are leaf nodes since none of these nodes has a child node. These nodes correspond to data containers within a respective directory. For example, C is a data container in directory A; H is a data container within sub-directory D and subdirectory E; F is a data container within directory B; and I is a data container within sub-directory E of the directory B. Applying the technique described in step 620, the indices are generated for leaf nodes as follows:

Parent_Index of C is a product of multiplication of inode number and Parent Index of immediate parents. C has one parent, A. A's tuple of indices is (2,1). The product of multiplication is 2. Thus, C's Parent_Index is 2. To this end, index generation engine reads inode number and Parent_Index of A from the inode data structure associated with A, generates Parent_Index, and stores the generated Parent_Index in the inode data structure associated with C.

Parent_Index of I is a product of multiplication of inode number and Parent Index of immediate parents. Data container I has one parent, E. E's tuple of indices is (7,3). The product of multiplication is 21. Thus, I's Parent_Index is 21. To this end, index generation engine reads inode number and Parent_Index of E from the inode data structure associated with E, generates Parent_Index, and stores the generated Parent_Index in the inode data structure associated with I.

Parent_Index of F is a product of multiplication of inode number and Parent Index of immediate parents. F has one parent, B. B's tuple of indices is (3,1). The product of multiplication is 3. Thus, F's Parent_Index is 3. To this end, index generation engine reads inode number and Parent_Index of B from the inode data structure associated with B, generates Parent_Index, and stores the generated Parent_Index in the inode data structure associated with F.

Parent_Index is generated for other nodes in a similar fashion by performing mathematical manipulations on the indices of the immediate parents of the nodes.

Parent_Index of H is a product of multiplication of inode number and Parent Index of immediate parents. H has two parents, D and E. E's tuple of indices is (7,3). D' tuple of indices is (5,2). The product of multiplication of all the indices is 7×3×5×2=210. Thus, H's Parent_Index is 210. To this end, index generation engine reads inode number and Parent_Index of D and E from the inode data structure associated with D and E respectively, generates Parent_Index, and stores the generated Parent_Index in the inode data structure associated with H.

As indicated earlier, Immediate Parent_Index is a product of multiplication of all the immediate parents directory inode numbers. To this end, index generation engine reads inode numbers of immediate parents of the leaf node from the inode data structures associated with the immediate parents and generates a product of the multiplication of the inode numbers.

Immediate_Parent_Index of C is a product of multiplication of inode numbers of immediate parents of C. C has only one parent, A. A's inode number is 2. Thus, Immediate Parent_Index of C=2

Immediate_Parent_Index of I is a product of multiplication of inode numbers of immediate parents of I. I has only one parent, E. E's inode number is 7. Thus, Immediate Parent_Index of I=7.

Immediate Parent_Index for other leaf nodes is generated in a similar fashion. Importantly, to generate indices for directory and leaf nodes, index generation engine merely accesses inode data structure associated with an immediate parent of a node for which indices are generated rather than accessing data structures for all ancestors of the node from the root node.

Thus, for leaf nodes C, H, I, and F, the following tuples of indices are generated by index generation engine and stored into corresponding inode data structure for these leaf nodes: C(2,2), H(210,35), I(21,7), and F(3,3).

Figure 7:
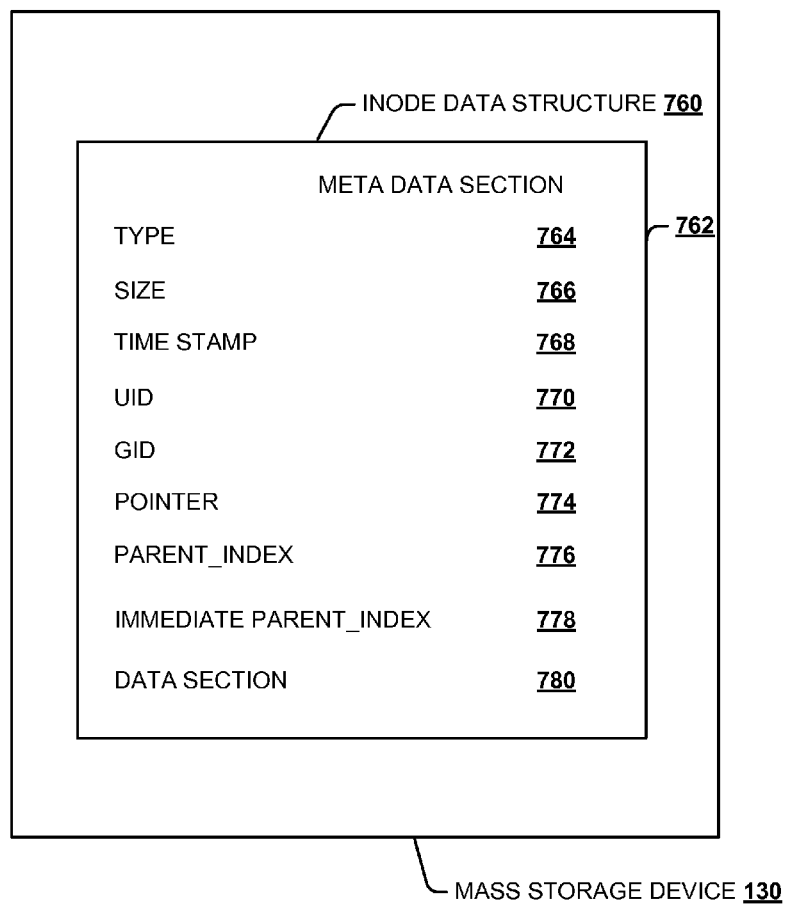
FIG. 7 is a block diagram of an exemplary inode data structure including metadata attributes describing a data container according to embodiments of the present invention.

In one implementation, the generated indices are stored in an inode data structure (as shown in FIG. 7 and will be described below) corresponding to a node (whether it is a data container or a directory). In some implementations, rather than choosing an inode number to be a unique prime number, any number can be chosen. In such implementations, a mapping data structure (not shown in Figs.) between the directory inode number and its corresponding assigned unique prime number can be maintained in memory and/or on mass storage devices, such as disks.

Referring again to FIG. 6, once a tuple of indices is generated for each directory node, sub-directory node, and leaf node, by the index generation engine, the generated indices can be mathematically manipulated (step 605) to determine whether a node is an ancestor of another node without performing multiple data accesses to the inode data structures of all the ancestor nodes of a given node. As described herein, an ancestor node of any node A is any node above A in a tree model, where "above" means "toward the root." For example, using the novel technique described herein, a Parent_Index of a leaf node can be used to determine all of its ancestor nodes by, for example, generating prime factors of the Parent_Index. The prime factors of a positive integer are the prime numbers that divide into that integer exactly, without leaving a remainder. The process of finding these numbers is called integer factorization, or prime factorization. Given the property of the prime numbers (e.g., a prime number is divisible only by one or itself), a product of the prime numbers is also divisible only by its prime factors. One without leaving a remainder, then the directory is one of the parents of the data container. The following example illustrates this point. Parent_Index of H, 210, can be factorized by the index manipulation engine and results into the following factors: 1,2,3,5,7. These are prime numbers that divide into 210 fully, without leaving a remainder. These prime numbers represent inode numbers of the Root, A, B, D, and E respectively, which are ancestors of the node H.

Still with reference to the flow diagram of FIG. 6, at step 630, the index manipulation engine reads the Parent_Index field of the inode data structure associated with a leaf node. Index manipulation engine further reads the inode number of a directory watched by a client(s) for modifications. Index manipulation engine determines whether Parent_Index of a leaf node is fully divisible by an inode number of a directory that is being watched by the client system for modifications. When a result of the division of two integers cannot be expressed with an integer quotient, the remainder is the amount "left over." If the Parent_Index is fully divisible (having a quotient without the remainder), it indicates that the directory is an ancestor of a leaf node and thus modifications to this directory need to be reported to a client.

If the directory is an ancestor of a leaf node, directory notification engine (340) sends a notification to client system 110 that watches the directory for modifications (step 640). Importantly, in prior art implementations, to determine a complete path of a leaf node (i.e., all ancestors of a leaf node up to the root node), an inode data structure for the leaf node would have to be accessed to read a pointer to the inode data structure of its parent node and so forth. Then a text base search might have to be performed to compare a path of a node with a name of a directory that is being watched for notification purposes. Rather than performing multiple accesses to inode data structures associated with ancestors of the modified leaf node (i.e., a data container), the index manipulation engine merely accesses a Parent_Index field in the inode data structure (e.g., 660) associated with the data container and mathematically manipulates the Parent_Index to determine ancestors of the data container. In one implementation, index manipulation engine divides Parent_Index by an inode number of a directory watched by the client system for modifications. If the result of the division does not leave a remainder, the registered directory is in fact an ancestor of the leaf node (and is on a path to the root node from the leaf node). Thus, notification engine notifies a client registered to receive notifications about changes within that directory.

The following example illustrates the above-described step. Assume that exemplary client 105 is registered with the file system to receive notifications about changes within directories A, B, and E. Assume that data container "I" has been recently accessed and modified. Parent_Index of I is "21." In order to determine whether directories A, B, and E are affected by the changes, a determination is made whether these directories are ancestors of data container "I." To this end, using the novel steps described herein, index manipulation engine accesses Parent_Index field in the inode data structure associated with the data container I. Index manipulation engine reads inode numbers of directories A, B, and E. Index manipulation engine then divides the Parent_Index by inode numbers of directories A, B, and E respectively. If the Parent_Index is fully divisible to the inode numbers of each directory without leaving a remainder, then it is said that these directories are ancestors of data container I. Parent_Index of I is 21, and inode numbers of A, B, and E are 2, 3, and 7 respectively:

21÷2=10.5
21÷3=7
21÷7=3.

As shown above, Parent_Index of I is fully divisible by inode number of B and E, but is not fully divisible by inode number of A (21 is not fully divisible by 2 since it leaves a remainder). This operation indicates that B and E are ancestor directories of I and client 105 should be notified about recent changes within directories B and E. In contrast, since A is not an ancestor of I and thus changes in I do not affect A, client 105 registered to receive notifications about changes to A will not receive notification concerning changes to data container I. Directory notification services updates can be performed by directory notification engine 340.

Referring now to FIG. 7, an exemplary inode data structure 760 stored on mass storage devices (e.g., 130) is shown. Triode data structure 760 may include a metadata section 762 and a data section 780. The information stored in metadata section 762 of each inode describes a data container and, as such, may include the following attributes: the data container type (e.g., regular or directory) 764, size 766 of the data container, time stamps 768 (e.g., access and/or modification) for the data container, ownership, i.e., user identifier (UID 770) and group ID (GID 772), of the data container, as well as other attributes. The metadata section 762 further includes a pointer 774 that points to a parent node.

According to novel techniques described herein, when indices are generated and stored for directory nodes and leaf nodes, they can be stored in the inode data structure corresponding to the node. Thus, as shown in FIG. 7, metadata section 762 can also store a Parent_Index 776 and Immediate Parent_Index 778. Those skilled in the art would understand that metadata section may include other attributes that are not shown in FIG. 7.

Using the techniques described above (e.g., generating and storing a tuple of indices to files and directories), directory quota maintenance can be performed in a more efficient manner. As described herein, maintaining directory quota involves setting a data container and a storage usage limit on a per directory basis, e.g., a limit on the usage by a particular user or a group for all data containers and sub-directories that reside under a given directory. Thus, if a data container is modified (e.g., blocks are allocated or freed), accounting related actions need to be performed for quota maintenance on one or more of its parent directories.

Figure 8:
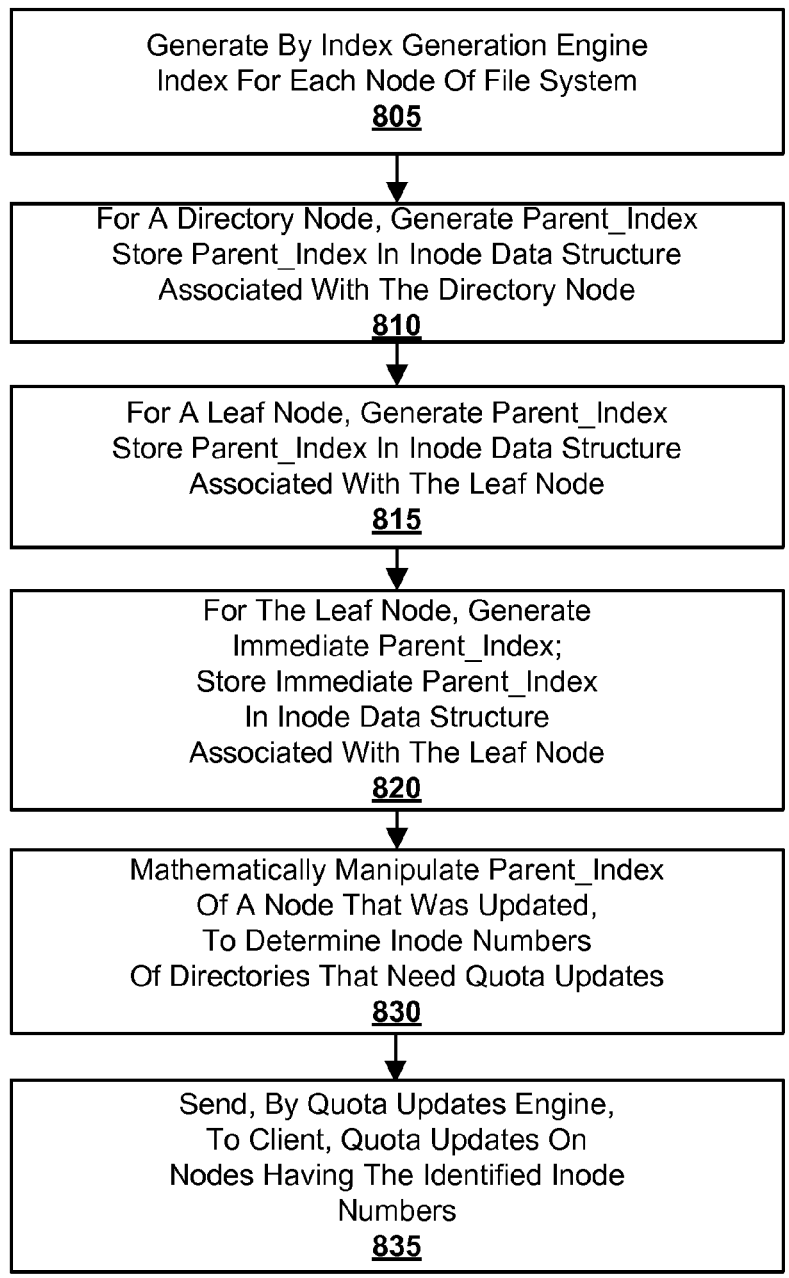
FIG. 8 is a flow diagram of a process performed by the server system shown in FIG. 1 to identify directory nodes that need quota updates according to embodiments of the present invention.

Referring now to FIG. 8, it illustrates steps performed by a server system to determine whether quota of a particular directory needs to be updated according to novel embodiments described herein. In step 805, index generation engine generates indices for each node in the file system similar to the step 605 in FIG. 6. In step 810, index generation engine generates indices for directory nodes, similar to step 610 in FIG. 6. In step 815, index generation engine generates the first index (Parent_Index) for the leaf nodes similar to the step 615 in FIG. 6. In step 820, index generation engine generates a second index, Immediate Parent_Index, for the leaf node, similarly to step 615 described in reference to FIG. 6.

A leaf node that was updated in the file system is identified by the file system using the known functionalities of the file system. Typically, when a data container is modified or new blocks are allocated or freed, the file system is notified. At step 830, Parent_Index is mathematically manipulated to determine inode numbers of directories that need quota updates. In one implementation, mathematical manipulation comprises generating factors of the Parent_Index of that node. The generated factors represent inode numbers of directory nodes that need quota updates. If Parent_Index of a leaf node is generated as a product of multiplication of Parent_Index and inode number of immediate parent nodes, prime factors represent inode numbers of directory nodes that are on a path to a modified data container from the root node. Thus, at step 835, quota updates are sent by the file system to the directories having inode numbers equal to the generated factors.

The following example will illustrate how inode numbers of the nodes that need quota updates are determined. Assume data blocks are allocated to leaf node H corresponding to a data container. Generating factors of Parent_Index of data container H involves computing prime numbers that are divided into Parent_Index of H exactly, without leaving a remainder. Since Parent_Index of H, 210, was computed as a product of multiplication of indices for E and D (7,3) and (5,2), then computed prime factors represent inode numbers of the following nodes: Root, A, B, D, and E.

The generated prime factors provide inode numbers of all directories and subdirectories that are ancestors of H: 210=1× 2×3×5×7. These prime factors correspond to inode numbers of the following directory nodes: Root, A, B, D, and E.

In another implementation, rather than generating prime factors, when a leaf node is modified, its Parent_Index is divided with the inode numbers of directories that are registered with the file system for quota maintenance. If the result of the division does not leave a remainder, the directory quota is updated by the file system for that directory.

The above-described technique of generating indices and mathematically manipulating indices for leaf nodes and directory nodes in a file system can be used to perform reverse path name lookup. A path is the route through a file system to a particular data container. Thus, finding a reverse path involves identifying all nodes up to the root node from a data container node. Using novel mechanisms described herein all different paths to a particular node are computed without performing multiple accesses to the inode data structure.

Figure 9:
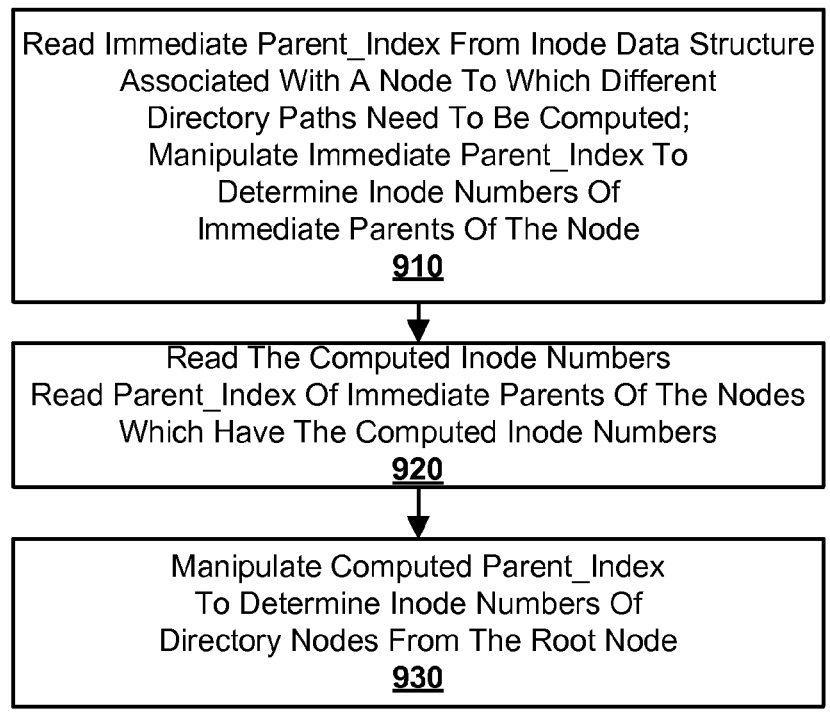
FIG. 9 is a flow diagram of a process executed by the server system shown in FIG. 1 to perform a reverse path name lookup according to embodiments of the present invention.

Referring now to FIG. 9, it illustrates computer implemented steps for generating all different paths to a particular node according to novel techniques. At step 910, the index manipulation engine reads Immediate Parent_Index from an inode data structure associated with a node to which directory paths need to be generated. Then, Immediate Parent_Index is mathematically manipulated by index manipulation engine. For example, in one embodiment, prime factors of the Immediate Parent_Index are generated. Since Parent_Index of a leaf node is a product of multiplication of indices of immediate parent nodes, the generated prime factors represent inode numbers of immediate parents of the node. The generated prime factors are stored, for example, at mass storage devices.

At step 920, the index manipulation engine reads the generated inode numbers. For each generated inode number corresponding to a node, a Parent_Index of each immediate parent of that node is read by the index manipulation engine from the inode data structure associated with that node.

At step 930, Parent_Index is mathematically manipulated by the index manipulation engine. In one implementation, prime factors of the Parent_Index are generated. Since a Parent_Index of a leaf node is a product of multiplication of indices of immediate parent nodes of the leaf node, which in turn represents a product of multiplication of inode numbers of all nodes on the path to the leaf node, generated prime factors of the Parent_Index represent inode numbers of all directory nodes from the root node on the path to the leaf node.

The above-described steps can be illustrated using the directory structure shown in FIG. 4. To generate different paths to leaf node H, its Immediate Parent_Index (35) is determined. The prime factors of the Immediate Parent_Index are generated as follows: 35=5,7. These prime factors are divided into 35 exactly, without a remainder. These prime factors represent inode numbers of two nodes (D and E) that are immediate parent nodes of H and thus are on the path to H from the root node.

As a next step, Parent_Index for nodes D and E are generated. Parent_Index of D is "2" and Parent_Index of E is "3". Since a Parent_Index of a leaf node is a product of multiplication of Parent_Index and inode number of immediate parents of the leaf node, prime factors of the Parent_Index represent inode numbers of all the directory nodes from the root node to the leaf node. Thus, prime factors for each Parent_Index are generated as follows:

For Directory D, prime factors of Parent_Index 2=2, 1
For Directory E, prime factors of Parent_Index 3=3, 1
Prime factors 2 and 1 represent inode numbers of the following directory nodes:
Root and A. Prime factors 3 and 1, in turn, represent inode numbers of the following directory nodes: Root and B.

Thus, one path to node H includes the nodes having the following tuples: Root (1,1), A(2,1), and D(5,2). Another path to node H includes the nodes having the following tuples: Root (1,1). B(3,1), and E(7,3). Importantly, finding a path to a leaf node is accomplished without performing multiple read operations to inode data structures associated with all nodes on the path to a leaf node. Instead, data structures associated with immediate parents of the leaf node are accessed.

Thus, embodiments described herein provide a mechanism for efficiently identifying ancestry associations for a data container or a directory in a file system without accessing data structures associated with all the ancestors of a particular data container or a directory. This novel technique can be used to provide notification services to client systems that are registered to receive notifications about changes to directories in the file system without performing multiple accesses to data structures residing on mass storage devices. Furthermore, if a data container is modified (e.g., blocks allocated or freed), the above-described technique to quickly identify parent directories can be used for quota maintenance on one or more of parent directories. Moreover, using this technique, all parent nodes that are on a path to a data container from the root node can be quickly identified without performing costly data structure accesses. The efficiency of the mechanism is provided by using the known properties of the prime numbers (e.g., a prime number is divisible only by one or itself and a product of the prime numbers is also divisible only by its prime factors). Furthermore, the above-described technique can be extended to determine all the different paths to access a given data container if the data container has multiple hard links (e.g., has more than one parent directory). To accomplish this, Immediate Parent_Index is generated and stored with a data container (for example, in an inode data structure associated with a data container). Those skilled in the art would understand that the generated indices can be stored in a separate data structure, such as a table for storing indices for all the nodes. The Immediate Parent_Index is generated by the index generation engine by reading inode numbers of immediate parents of a data container and performing mathematical manipulations on the inode numbers of immediate parents of the leaf node. While the Parent_Index can be used to determine all the parents of a given data container, the Immediate Parent_Index can be used to determine all the immediate parents of a given data container. Knowing the immediate parents of the data container, all different paths to the data container can be identified.

Those skilled in the art would understand that the invention is not limited to the embodiments described, but can be practiced with modifications. For example, in alternative embodiments, not every directory node in the file system needs to be associated with a prime number. Thus, some embodiments may store prime numbers only with those parent directories that have set up a directory quota or directory notification service. Furthermore, in these embodiments, directory inode numbers do not need to be unique prime numbers. As an alternative, a unique prime number can be assigned to the parent directories that have set up a directory quota or directory notification service. This unique prime number can be stored as a metadata in an inode data structure. A one-to-one mapping (not shown in Figs.) can be maintained between a directory inode (that has setup directory quota or directory notification service) and a unique prime number. Such mapping can be stored on a storage device or in memory. In such implementations, Parent_Index of the inode can be expressed as a multiplication of unique prime numbers of all the parent directories which have directory quota setup or which have signed up for directory notification service.

According to yet another embodiment of the present invention, indices for each directory node can be stored at a leaf node residing in that directory node rather than being stored at the directory node. Thus, in reference to FIG. 5, indices for Root and directory A can be stored at the leaf node C or leaf node D. Similarly, indices for the Root node, directory B, and directory E can be stored at the leaf node H. This embodiment thus does not require using properties of prime numbers when providing inode numbers to the nodes by the file system.

Index generation engine, index manipulation engine, and directory notification engine may be implemented in software executed on a programmable processor, hardware or a combination of hardware and such software. That is, in an alternative embodiment, these engines can be implemented as logic circuitry embodied, for example, within a microprocessor, controller, like a programmable gate array or an application specific integrated circuit (ASIC).

The present invention can be implemented by apparatuses for performing the operations herein. These apparatuses may comprise a machine, which may be a general-purpose machine selectively activated or reconfigured by a computer program (such as a collection of instructions for execution by a machine or processor for example) and stored in a computer. Such a computer program may be stored in a computer readable storage medium, such as, but not limited to any type of mass storage device, e.g., magnetic disks, optical disks, read-only memories, random access memories, EPROMS, EEPROMS, magnetic or optical cards or any type of media suitable for storing physical (e.g. electronic) constructions and each capable of communicating with a computer system for execution of the instructions by e.g., through use of an appropriate device for reading and/or for writing the media.

What is claimed is:

1. A method for sending a notification by a server system of changes in a directory registered for notification, the server system including a processor, the method comprising:
generating an index for a node of a file system, the file system comprising a plurality of nodes, at least one of the nodes having an ancestor node, each node comprising a data container, each node associated with a unique numeric identifier;
in response to a request received by the server system to modify a node, determining whether a directory is an ancestor node of the modified node by dividing the numeric identifier of the directory node into the index of the modified node, whereby no remainder resulting from the division determines the directory node is an ancestor of the modified node;
sending a notification of a change in the directory registered for notification, wherein the directory registered for notification is associated with the directory node.

2. The method of claim 1, further comprising:
generating for each directory node, a first index representing a unique numeric identifier of the directory node, and a second index representing a product of mathematical manipulation of a first index and a second index of the immediate parent of the directory node so that the second index uniquely identifies the parents of the directory node;
generating, for each leaf node, a first index representing a product of mathematical manipulation of a first index and a second index of each immediate parent node of the leaf node, wherein a second index of the leaf node is a multiplication of a unique numeric identifier of each immediate parent of the leaf node.

3. The method of claim 2, wherein performing mathematical manipulation of the first index and the second index of the immediate parents of the directory node further comprises multiplying the first index and the second index of the immediate parents of the directory node.

4. The method of claim 2, wherein performing mathematical manipulation of the first index and the second index of the immediate parents of the leaf node further comprises multiplying the first index and the second index of the immediate parents of the leaf node.

5. The method of claim 1, further comprising:
generating prime factors of the index of the modified node, wherein the generated prime factors represent the numeric identifiers of one or more parent directories of the modified node; and
sending a quota update for a directory registered for notification, wherein the directory registered is within a set of the one or more parent directories of the modified node.

6. The method of claim 2, wherein mathematically manipulating the index to identify an ancestor node of the modified node further comprises:
generating prime factors of the second index of the modified node, the generated prime factors represent inode numbers identifying parent directories of the modified node; and
generating prime factors of the first index of the modified node, the generated prime factors represent inode numbers identifying all directory nodes on the path from a root to the modified node.

7. The method of claim 1, wherein the numeric identifier of each node represents a prime number, and wherein the index of the node represents a product of a plurality of prime numbers.

8. The method of claim 2, wherein mathematical manipulation to identify an ancestor node of the modified node further comprises: generating prime factors of the first index of the modified node, the prime factors representing numeric identifiers of the directory nodes that are ancestors of the modified node; and
wherein the method further comprises sending a notification of a quota update on a directory node that is an ancestor of the modified node.

9. The method of claim 1, wherein a data structure for each data container is an inode data structure configured to store data describing a data container.

10. A server system for sending a notification of changes in a directory registered for notification, the server system comprising:
a processor;
an index generation engine generating a first index and a second index for each node of a file system, comprising a plurality of nodes, at least one of the nodes having an ancestor node, each node comprising a data container and comprising a first index and a second index;
an index manipulation engine configured, in response to a request received by the server system to modify a node, to divide the first index of the modified node by the inode number of the directory registered for notification and responsive to the result of the division not leaving a remainder, determine the directory registered for changes is an ancestor of the modified node, without performing a text-based comparison using a name of the ancestor node; and
a directory notification engine configured to send a notification of a modification in the directory registered for notification.

11. The system of claim 10, further comprising a quota updates engine configured to send a notification by the server system of a quota update on a directory node that is an ancestor of the modified node.

12. The system of claim 10, wherein the index generation engine is further configured to multiply the first index and the second index of the immediate parents of the node to generate a second index of each directory node.

13. The system of claim 10, wherein the index generation engine is further configured to multiply the first index and the second index of the immediate parents of the modified node to generate a first index of the modified node.

14. The system of claim 10, wherein the index manipulation engine is further configured to generate prime factors of the first index of the modified node, wherein the generated prime factors represent inode numbers of the parent directories of the modified node.

15. The system of claim 10, wherein the index manipulation engine is further configured to:
generate prime factors of the second index of the modified node, the generated prime factors represent inode numbers identifying the immediate parent directories of the modified node; and
generate prime factors of the first index of the modified node, the generated prime factors represent inode numbers identifying all directory nodes on the path from a root to the modified node.

16. A method for sending a change notification by a server of changes in a file system directory registered for notification, the server system including a processor, the method comprising:
generating, for each directory node of a file system, a first index and a second index, the first index representing an inode number of the directory, the second index representing a multiplication of a first index and a second index of an immediate parent of the directory node, the file system comprising a plurality of nodes including a root node, each node comprising a first index and a second index;
generating, for each data container node of the file system, a first index and a second index, the first index representing an inode number the immediate parent of the data container node, the second index representing a multiplication of a first index and second index of the immediate parent of the data container;
in response to a request received by the server system to modify a data container node, identifying an ancestor node by dividing the second index of the modified data container node by the first index of the directory registered for change, wherein the ancestor node is associated with the directory registered for change; and
in response to no remainder resulting from the division, sending a notification of a change in the file system directory registered for notification.

17. The method of claim 16, further comprising:
generating prime factors of the index of the modified data container node, the prime factors representing inode numbers identifying all the directory nodes that are on a path from the root node to the modified data container node; and
sending a notification of a quota update on a directory node on the path from the root node to the modified data container node.

18. A non-transitory computer readable medium containing executable program instructions for execution by a processor, comprising:

program instructions that generate an index in a data structure associated with each node of a file system, whereby the index of a root node identifies a node;

program instructions that in response to a request received via a file-based protocol to modify a node, identify an ancestor node by dividing the index associated with the modified node by the inode number of an ancestor node of the modified node, the ancestor node associated with a directory registered for notification, whereby no remainder resulting from the division identifies the directory registered for notification as an ancestor of the modified node; and program instructions that send a notification via the file-based protocol of a change in the directory registered for notification.

19. The non-transitory computer readable medium of claim 18, further comprising:

program instructions that generate prime factors of the first index of the modified node, the generated prime factors represent inode numbers identifying all ancestor nodes on the path from the root to the modified node;

program instructions that send a quota update for an ancestor node on the path path from the root to the modified node.

20. The non-transitory computer readable medium of claim 18, wherein the index is a product of prime numbers.

21. The non-transitory computer readable medium of claim 18, wherein the index is a product of a set of prime numbers, the set of prime numbers identifying all ancestor nodes of the modified node.

22. A method for sending a notification by a server system of changes in a directory registered for notification, the server system including a processor, the method comprising:

generating a first index and a second index associated with each leaf node of a file system, comprising a plurality of nodes, each leaf node having at least one ancestor node, and each leaf node comprising a data container, a first index, and a second index, wherein the first index is a multiplication a plurality of prime numbers, and wherein the second index is a multiplication of a plurality of prime numbers;

in response to a request received by the server system to modify a leaf node, identifying an ancestor node by dividing the first index associated with the modified leaf node by a prime number associated with the ancestor node, the ancestor node associated with the directory registered for notification; and sending a notification of a change in the directory registered for notification.

23. The method of claim 22, wherein the step of identifying an ancestor node is performed without a text-based comparison using a name of the ancestor node.

24. The method of claim 22, wherein a prime number identifying each ancestor of the modified leaf node is used to form the product of prime numbers of the first index.

25. A system for sending a notification by a server system of changes in a directory registered for notification, the server system comprising:

a processor;

an index generation engine generating a first index and a second index for each leaf node of a file system, comprising a plurality of nodes, each leaf node having at least one ancestor node, and each leaf node comprising a data container, a first index, and a second index, wherein the first index is a product of a first set of prime numbers, and wherein the second index is a product of a second set of prime numbers;

an index manipulation engine configured, in response to a request received by the server system to modify a leaf node, to divide the first index associated the modified leaf node by a prime number associated with a directory node, to determine whether the directory node is an ancestor of the modified leaf node, the ancestor node associated with the directory registered for notification; and a directory notification engine configured to send a notification of a modification in the directory registered for notification.

26. Apparatus of claim 25, wherein the index manipulation engine determines an ancestor node of the modified leaf node without a text-based comparison using a name of the ancestor node.

27. Apparatus of claim 25, wherein the index generation engine uses a prime number identifying each ancestor of the modified leaf node to form the product of the first set of prime numbers of the first index.

* * * * *

UNITED STATES PATENT AND TRADEMARK OFFICE
CERTIFICATE OF CORRECTION

PATENT NO. : 8,266,136 B1
APPLICATION NO. : 12/422648
DATED : September 11, 2012
INVENTOR(S) : Podge et al.

Page 1 of 1

It is certified that error appears in the above-identified patent and that said Letters Patent is hereby corrected as shown below:

In the Specifications

In col. 12, line 61 should read:
~~Triode~~ Inode data structure 760 may include a metadata section 762

In the Claims

In col. 18, line 43, Claim 16 should read:
senting an inode number of the immediate parent of the In col. 19, line 23, Claim 19 should read:
tor node on the path from the root to the modified In col. 20, line 26, Claim 25 should read:
node, to divide the first index associated with the modified Signed and Sealed this
Eighteenth Day of June, 2013

Teresa Stanek Rea
*Acting Director of the United States Patent and Trademark Office*